May 19, 1953 D. JOHNSON 2,639,171
SHAFT SEAL APPARATUS
Filed June 7, 1950 2 Sheets-Sheet 1

WITNESSES:
E. H. Lutz.
D. J. McCarty

INVENTOR
DOUGLAS JOHNSON
BY
Robert T. French
ATTORNEY

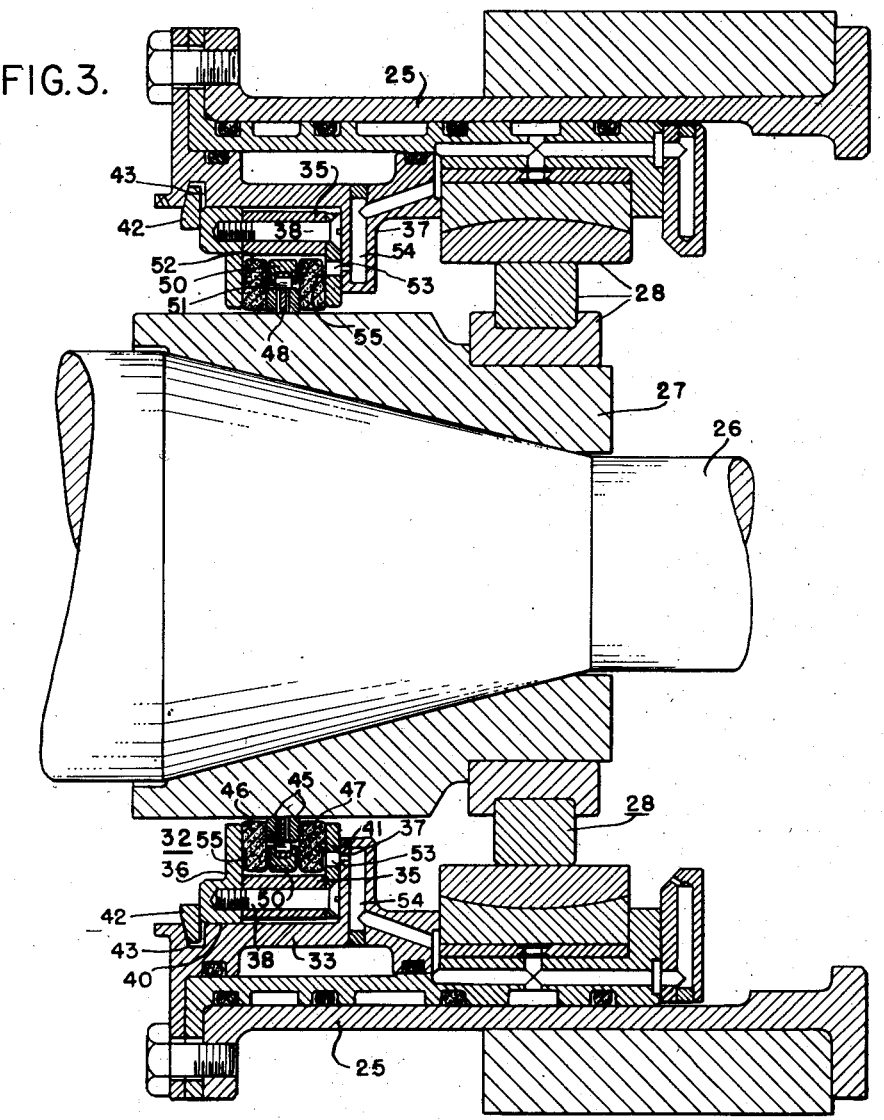

Patented May 19, 1953

2,639,171

UNITED STATES PATENT OFFICE 2,639,171

SHAFT SEAL APPARATUS

Douglas Johnson, Ridley Park, Pa., assignor to Westinghouse Electric Corporation, East Pittsburgh, Pa., a corporation of Pennsylvania Application June 7, 1950, Serial No. 166,723

2 Claims. (Cl. 286—11.15)

This invention relates to shaft seals for prime movers, and more particularly to an oil seal for the shaft of a power plant operative under high temperature and variable pressure conditions, such as an aviation gas turbine engine.

It is an object of the invention to provide an improved shaft seal assembly having relatively long axial travel and adapted to withstand high temperatures while maintaining a positive seal against leakage of fluid under pressure.

Another object of the invention is to provide an improved oil seal of simple construction and minimum bulk which may readily be installed either in an existing gas turbine engine or in a power plant of more advanced design.

These and other objects are effected by the invention as will be apparent from the following description and claims taken in connection with the accompanying drawings, forming a part of this application, in which:

Fig. 3 is a longitudinal sectional view, in enlarged detail, of a different form of seal assembly constructed in accordance with the invention.

Figure 1:
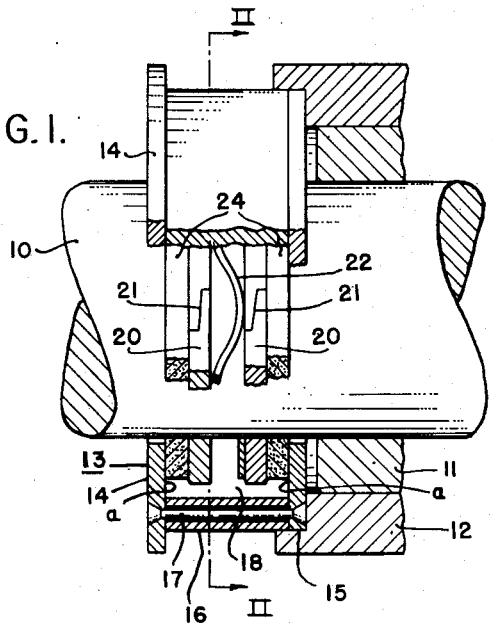
Fig. 1 is a longitudinal view, partly sectioned, of a shaft equipped with a packing or seal assembly constructed in accordance with the invention.
Figure 2:
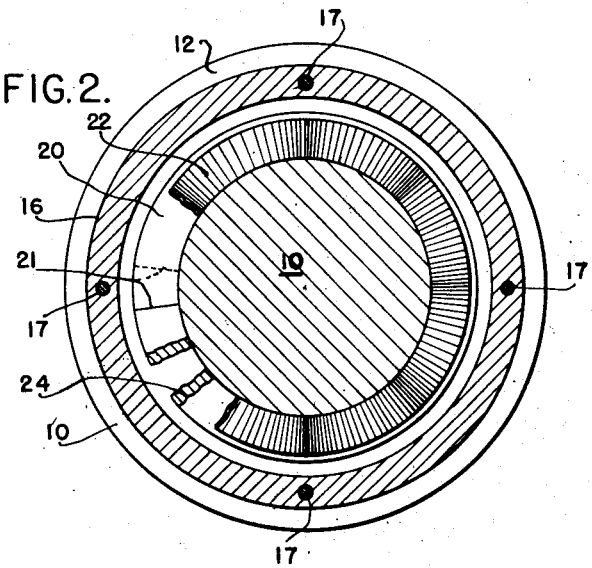
Fig. 2 is a sectional view taken along the line II—II of Fig. 1.

Referring to Fig. 1, a shaft 10 of a gas turbine or the like may be rotatably mounted in a suitable bearing 11 carried in a casing structure 12 surrounding the shaft. The casing structure 12 is adapted to support an oil seal assembly generally indicated at 13. According to the invention, the seal assembly 13 comprises annular end plates 14 and 15 which encompass the shaft 10 in axially spaced relation and are secured to opposite ends of an annular spacer member 16 by suitable means such as axially disposed rivets 17. The spacer member 16 engages the outer circumferential margins of the plates 14 and 15 to form an inner annular space or channel 18 surrounding the shaft, with the flat inner faces "a" of the plates 14 and 15 disposed normal to the shaft axis. Suitable supporting means may be provided for the assembled plates and spacer member, such as a counterbore formed in the casing structure 12 for receiving a portion of the assembly.

Within the channel 18, the shaft 10 carries a pair of spaced split annular members or piston rings 20, which preferably have lap joints 21 and are adapted to be expanded into close engagement with the shaft for rotation therewith. As shown in Fig. 1, an annular corrugated spring 22 is interposed between the piston rings 20 for urging them apart in an axial direction. A pair of annular seal elements 24, formed of a suitable carbonaceous material and having flat sides, are provided to complete the assembly, each seal element being interposed between one of the piston rings 20 and the adjacent flat face "a" of the corresponding end plate. All rubbing surfaces of the rings, seal elements, and plates are lapped optically flat. The force of the spring 22 is thus rendered effective through the medium of the piston rings 20 to urge the carbon seal elements 24 into sealing engagement with the flat faces "a" of the respective end plates 14 and 15. If desired, a suitable lubricant may be supplied to the channel 18 outwardly of the piston rings and seal members of the seal assembly.

In Fig. 3, a typical bearing and seal assembly embodying the invention is illustrated in a different form suitable for use with a high speed shaft, such as that of a gas turbine engine. A bearing carrier structure 25 surrounds one end of a shaft 26, to which is secured a bearing collar element 27 which is in turn journaled in a bearing assembly indicated generally at 28. The bearing assembly need not be described in detail, but it will be understood that suitable lubricating means (not shown) may be associated therewith, including communications formed in the carrier structure 25 for feeding oil under pressure to the desired elements of the assembly.

A seal assembly generally indicated at 32 is disposed circumferentially of the collar element 27 and is secured to an annular casing section 33 supported by bearing carrier structure 25 adjacent the bearing assembly 28. The seal assembly 32 comprises an annular spacer member 35 to the sides of which the outer marginal portions of annular end plates 36 and 37 are secured by means of longitudinally disposed bolts 38. An interior annular face 40 and an adjoining inwardly projecting flange surface 41 are formed on the casing section 33 for engagement by the end plates 36 and 37, respectively. For clamping the seal assembly 32 in place, an annular wedge element 42 is expanded into a groove 43 formed in the casing section 33, the inner edge of the wedge element being held in engagement with the outer side of the end plate 36.

Other elements of the seal assembly 32 are similar to those of the seal assembly 13 already described, and include a pair of piston rings or split rings 45 that are mounted on the shaft collar element 27, for rotation therewith, between longitudinally spaced carbonaceous seal rings 46 and 47, which are disposed in slidable engagement with the respective rotatable rings and the inner sides of the end plates 36 and 37. An annular axially biasing spring 48, similar to spring 22 shown in Fig. 1, may be interposed between the rings 45. For resisting displacement of the split rings 45 relative to the collar element under the effect of centrifugal force, a relatively rigid steel retainer ring 50 is disposed circumferentially of the split rings 45, and carries a retainer spring 51 of conventional wave-like form, which in turn bears inwardly against the peripheral edges of the split rings.

For lubrication purposes, the annular space 52 formed between the spacer member 35 and the rings 46 may be supplied with oil by way of a number of ports 53 which are formed in the end plate 37 and communicate with the usual bearing lubricating system by way of an annular lubrication passage 54. Annular recesses 55 may be formed in the outer lateral faces of the carbonaceous rings 46 and 47, for facilitating distribution of the oil admitted through the ports 53.

The improved oil seal assembly thus constructed is adapted to withstand high operating temperatures, such as the temperatures encountered in operation of a gas turbine. With the piston rings or split rings mounted in close engagement with the shaft for rotation therewith, and with the carbon seal elements held in floating frictional contact with the flat surfaces of the rings and end plates, a positive seal against leakage of fluid along the shaft will be maintained throughout a long service life.

While the invention has been shown in but one form, it will be obvious to those skilled in the art that it is not so limited, but is susceptible of various changes and modifications without departing from the spirit thereof.

What is claimed is:

1. A fluid seal for a rotary shaft comprising a pair of split, lap-jointed metal rings frictionally engaging the shaft and rotatable therewith, said rings having flat sides extending radially of said shaft, an annular retainer member spaced outwardly of and encircling said split rings, spring means interposed between said retainer member and the peripheral portions of said split rings for resisting displacement thereof by centrifugal force, stationary annular channel structure encompassing the portion of said shaft carrying said rings and retainer member and having end walls disposed parallel to said rings, and a plurality of rings formed of carbonaceous material slidably interposed between said metal rings and said end walls of the channel structure.

2. A fluid seal for a rotary shaft comprising a pair of split, lap-jointed metal rings frictionally engaging the shaft and rotatable therewith, said rings having flat sides extending radially of said shaft, an annular retainer member spaced outwardly of and encircling said split rings, spring means interposed between said retainer member and the peripheral portions of said split rings for resisting displacement thereof by centrifugal force, stationary annular channel structure encompassing the portion of said shaft carrying said rings and retainer member, said channel structure including end walls disposed parallel to said rings and an annular spacer element disposed between said walls, and a plurality of rings formed of carbonaceous material slidably interposed between said metal rings and said end walls of the channel structure, each of said carbonaceous rings having an inner diameter larger than that of said shaft and a peripheral surface spaced inwardly of said annular spacer element.

DOUGLAS JOHNSON.

References Cited in the file of this patent

UNITED STATES PATENTS

| Number | Name | Date |
|---|---|---|
| 1,858,681 | Olson | May 17, 1932 |
| 1,859,436 | Durdin | May 24, 1932 |
| 1,869,933 | Cooke | Aug. 2, 1932 |
| 1,959,697 | Tracy | May 22, 1934 |
| 1,991,077 | Brittain | Feb. 12, 1935 |
| 2,339,099 | Hamur | Jan. 11, 1944 |
| 2,372,103 | Morton | Mar. 20, 1945 |
| 2,393,944 | Walley | Jan. 29, 1946 |
| 2,500,359 | Jewett | Mar. 14, 1950 |
| 2,561,694 | Gilbert | July 24, 1951 |
| 2,586,739 | Summers | Feb. 19, 1952 |